(12) United States Patent
Xie et al.

(10) Patent No.: US 7,793,981 B2
(45) Date of Patent: Sep. 14, 2010

(54) JOINT, MAIN BEAM OF CONTAINER SEMI-TRAILER PROVIDED WITH THE JOINT AND THE CONNECTING METHOD THEREOF

(75) Inventors: Liangfu Xie, Guangdong (CN); Xiya Li, Guangdong (CN); Zhuoan Wu, Guangdong (CN); You Gong, Guangdong (CN)

(73) Assignees: China International Marine Containers (Group) Co., Ltd, Guangdong (CN); CIMC Vehicles Group Co., Ltd., Guangdong (CN)

( * ) Notice: Subject to any disclaimer, the term of this patent is extended or adjusted under 35 U.S.C. 154(b) by 115 days.

(21) Appl. No.: 11/788,197

(22) Filed: Apr. 19, 2007

(65) Prior Publication Data

US 2008/0035814 A1 Feb. 14, 2008

(30) Foreign Application Priority Data

May 16, 2006 (CN) .................... 2006 1 0011915

(51) Int. Cl.
*B62D 21/12* (2006.01)

(52) U.S. Cl. .................... 280/785; 52/848; 403/337; 403/340

(58) Field of Classification Search ................ 403/292, 403/335, 337, 339, 340, 344, 363; 52/848, 52/FOR. 116, FOR. 117; 280/785
See application file for complete search history.

(56) References Cited

U.S. PATENT DOCUMENTS

| 4,344,718 | A | * | 8/1982 | Taylor | ........................ 403/339 |
| 5,005,864 | A | * | 4/1991 | Chachere | .................... 280/785 |
| 5,688,069 | A | * | 11/1997 | Hoshino | ..................... 403/340 |
| 2003/0231926 | A1 | * | 12/2003 | Thach | ......................... 403/339 |

* cited by examiner

*Primary Examiner*—Michael P Ferguson
(74) *Attorney, Agent, or Firm*—Greer, Burns & Crain, Ltd.

(57) ABSTRACT

A main beam of a container semi-trailer provided with the joint, and the connecting method thereof. The joint is used to connect a main beam and has a first connecting plate connected to the main beam; a second and a third connecting plate secured to the same side of the first connecting plate and spaced apart to each other; and a fourth connecting plate slantingly connected between the second and third connecting plates.

10 Claims, 6 Drawing Sheets

JOINT, MAIN BEAM OF CONTAINER SEMI-TRAILER PROVIDED WITH THE JOINT AND THE CONNECTING METHOD THEREOF

FIELD OF THE INVENTION

The present invention relates to a joint, a main beam of container semi-trailer provided with the joint and the connecting method thereof, and more particularly to a joint which can be used for stably and reliably connecting the main beams of a semi-trailer for container transportation to form a complete beam, and a main beam of container semi-trailer provided with the joint and the connecting method thereof.

BACKGROUND OF THE INVENTION

The length of a semi-trailer for transporting containers closely relates to the length of the containers. For example, a domestic container of inland America is 53 feet in length, so that a semi-trailer for transporting the container should be longer than 53 feet in length. There are two methods for shipping these extremely long semi-trailers. The first method is to use bulk cargo ships and the second method is to use container vessels. By using bulk cargo ships, the semi-trailers can be transported integrally. However, the first method occupies substantial space and the freight cost is high. Additionally, the shipping frequency of bulk cargo ships is too low to meet delivery requirements. With the second method, the shipping frequency of the container vessels is high, and the freight cost is low, but there are limitations on cargo of extreme length. Since the length of the ISO container is 20 or 40 feet, in order to transport the semi-trailer by using the ISO containers, the semi-trailer should be segmented into two or more parts, and assembled after arriving at its destination to form a complete semi-trailer. Usually, the segmented semi-trailers are assembled by using joints. FIG. 1 illustrates the structure of a two-segment semi-trailer for transporting 53' containers. Because the main beam of the semi-trailer is too long to be transported as a whole, the main beam 1 is segmented into a front beam 1a and a rear beam 1b. After reaching the destination, the front beam 1a and the rear beam 1b are assembled by a joint 3 to form the main beam 1 of semi-trailer for transporting 53' container.

The conventional joint is a connecting plate welded on a cross section of a main beam of the semi-trailer. An I-shaped main beam of container semi-trailer in FIG. 2 shown as example illustrates the structural of the conventional joint. The joints are two connecting plates 6 respectively welded on the cross-section of the front beam 2a and the rear beam 2b of the main beam. Each of the connecting plates 6 has six bolt holes 8, therefore bolts can be used to connect the front beam 2a and the rear beam 2b by the connecting plates 6. Additionally, two ribs 7 are disposed on the inner side of connecting plate 6 which is connected to the web plate of the I-shaped main beam to prevent the connecting plates from deforming after they are connected by bolts. FIG. 3 illustrates the main beam of container semi-trailer provided with the conventional joints. The connecting of the main beam of container semi-trailer follows the following steps. First two joints 6 of the front beam 2a and rear beam 2b of the main beam are aligned with each other, and six bolts are inserted into six bolt holes 8 respectively and fastened by a fastening tool to form a complete main beam. This is a simple and practical connecting method. However, it can be clearly seen from the figures that with this structure, the bolts bear all the forces transferred to the joint when the semi-trailer is running. During running of the semi-trailer, the main beam is often in situations of being stretched, bent, twisted, or sheared etc. All of these operating conditions are directly transferred to the bolts, resulting in that strength of the main beam is actually assured by the strength of the bolts. However, in various operating conditions, the forces on the bolts are asymmetric. Therefore, some bolts will bear a very large force which may exceed the yield limit of the bolts so that the bolts are deformed or destroyed. Additionally, when the main beam is bent, the tension of the bolts adjacent to the pulling side of the joint is increased because the pretightening force is superimposed by a new pulling force. The pretightening force of bolts adjacent to the pressing side is decreased, and this may loosen the bolts. In practice, it may be an alternate process, i.e. a certain bolt is tightened and loosened alternately which may result in a failed connection.

As mentioned above, it is necessary to design a reliable joint suitable for container transportation of a segmented semi-trailer.

SUMMARY OF THE INVENTION

An object of the present invention is to provide a joint for easily and reliably connecting a segmented main beam of the semi-trailer and for bearing all kinds of forces in various operating conditions such as stretching, bending, twisting and shearing etc. to enhance the reliability of the connection of the main beam.

Another object of the present invention is to provide a main beam of a container semi-trailer which is easy to be connected and convenient to be transported, with excellent operational security and reliability.

Another object of the present invention is to provide a connecting method to safely and reliably assemble the main beam of a container semi-trailer.

To achieve the aforementioned objects, the present invention provides a joint for connecting a main beam, characterized in that the joint comprises: a first connecting plate connected to the main beam; a second connecting plate and a third connecting plate fixed to the same side of the first connecting plate and spaced apart to each other; and a fourth connecting plate slantingly connected between the second connecting plate and the third connecting plate.

Herein, the joint further comprises a web plate mounted in an inner chamber defined by the first, second, third and fourth connecting plates to reinforce the joint. Two first ribs are respectively disposed on two sides of the web plate and connected to the fourth connecting plate to reinforce the fourth connecting plate.

Herein, the third connecting plate has a connecting surface directed toward the second connecting plate, and a rear surface on which the second rib reinforcing the said third connecting plate are disposed. The second connecting plate and the third connecting plate are parallel, and both are slanted relative to the fourth connecting plate. Holes for fasteners are disposed on the second, third and fourth connecting plate respectively.

Herein, the second connecting plate comprises: a base; and a bent portion sunk from the first base and fixed to the first connecting plate. The third connecting plate comprises a base fixed to the first connecting plate, and a bent portion protruding from the second base.

To achieve the aforementioned objects, the present invention further provides a main beam having at least a front beam and a rear beam, wherein the front beam and rear beam are connected by at least two joints, each said joint comprises: a first connecting plate connected to the main beam; a second and a third connecting plate secured to the same side of the first connecting plate and spaced apart from each other; and a fourth connecting plate slantingly connected between the second and third connecting plates.

Herein, the joint on the front beam is in an arrangement of rotation of 180° about the joint on the rear beam.

To achieve the aforementioned objects, the present invention further provides a method of connecting a main beam of container semi-trailer, said main beam of container semi-trailer comprises at least a front beam and a rear beam, said method comprises the following steps: providing a first joint connected to the front beam and a second joint connected to the rear beam, wherein each said joint has a first connecting plate connected to the beam; a second and a third connecting plate secured to the same side of the first connecting plate and spaced apart to each other; and a fourth connecting plate slantingly connected between the second and third connecting plates.

The method further comprises step of rotating the second joint 180° about the first joint and then fixing the second joint to the rear beam.

The method further comprises step of connecting the second connecting plate of the first joint to the third connecting plate of the second joint; connecting the third connecting plate of the first joint to the second connecting plate of the second joint; and connecting the fourth connecting plates of the first and second joints.

It is can be seen that the joint of the present invention is easy to be manufactured, and easy to be assembled, with a self-limit function. Compared to the conventional joint, the joint of the present invention has an improved stress condition when an external force exists, thus the reliability of the connection is greatly enhanced.

The present invention will be described in detail with reference to the following accompany drawings and preferred embodiments.

BRIEF DESCRIPTION OF THE DRAWINGS

FIG. 4b illustrates the structure of a web plate of the joint shown in FIG. 4a;

DETAILED DESCRIPTION OF PREFERRED EMBODIMENTS

Figure 4A:
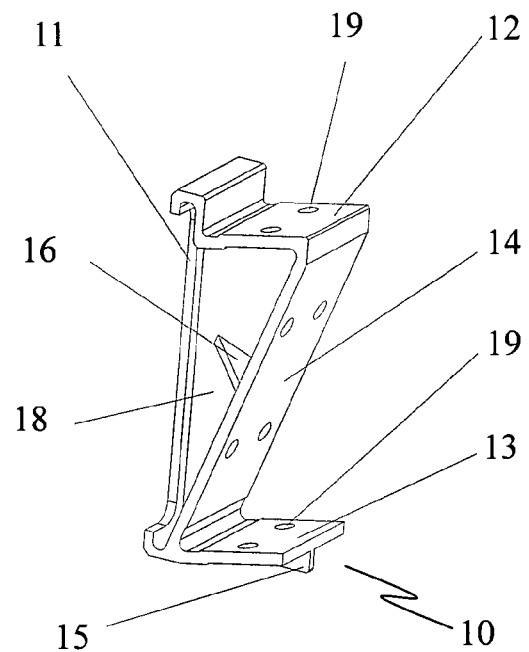
FIG. 4a is a three-dimensional drawing of a joint according to the preferred embodiment of the present invention.
Figure 4B:
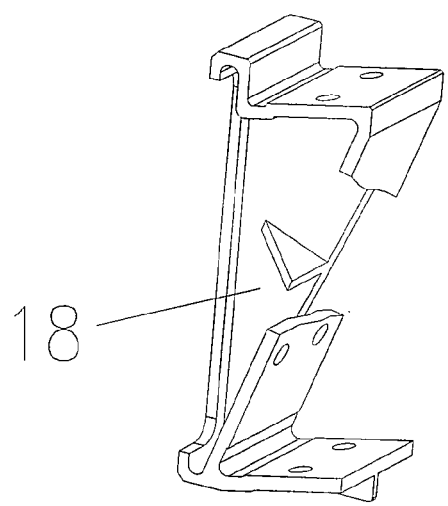
Figure 5:
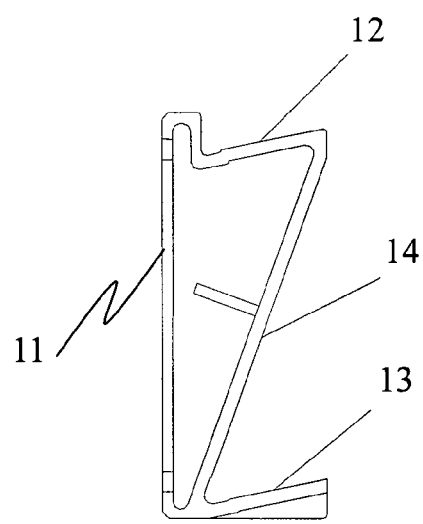
FIG. 5 is a side view of the web plate in FIG. 4b.

A joint according to the present invention is described hereinafter with reference to a preferred embodiment. As shown in FIG. 4a, the joint 10 comprises: a first connecting plate 11 connected to the main beam; a second connecting plate 12 and a third connecting plate 13, both of which are secured to the same side of said first connecting plate 11 and spaced apart by a certain distance; and a fourth connecting plate 14 slantingly connected between said second connecting plate 12 and said third connecting plate 13. Two holes 19 for fasteners are disposed on each of said second connecting plate 12 and said third connecting plate 13, and four holes 19 for fasteners are disposed on the fourth connecting plate 14. The second to fourth connecting plate 12~14 are disposed on the same side of the first connecting plate 11, and in one embodiment of the present invention, the slant angle between said second and third connecting plate 12,13 and said first connecting plate directed towards the same direction. The first connecting plate 11 is designed corresponding to shape of the cross-section of the main beam to achieve a better connection. For example, the first connecting plate 11 is designed with an I-shaped cross section to match the I-shaped cross section of the main beam. As shown in FIG. 4a, a web plate 18 is disposed in a chamber defined by the three connecting plates 11, 12 and 14, for example the web plate 18 is disposed at a symmetric plane of the chamber. The web plate 18 connects the first to fourth connecting plate 11~14 to reinforce the joint 10. Two first reinforcing ribs 16 are disposed on both sides of the web plate 18 connected to the fourth connecting plate 14. The third connecting plate 13 has a connecting surface directed toward the second connecting plate 12. A second reinforcing rib 15 is disposed on the surface of the third connecting plate 13 opposed to said connecting surface. In addition, as shown in FIG. 5, the second and the third connecting plate 12, 13 are slightly slantwise relative to the fourth connecting plate 14 by the same angle, thus forming a whole connecting joint (hereinafter named "joint"). In one embodiment of the present invention, the joint is made by steel-casting. According to operational condition, a joint with the same or similar performance can be manufactured by means of other suitable means such as forging or powder metallurgy.

Figure 6:
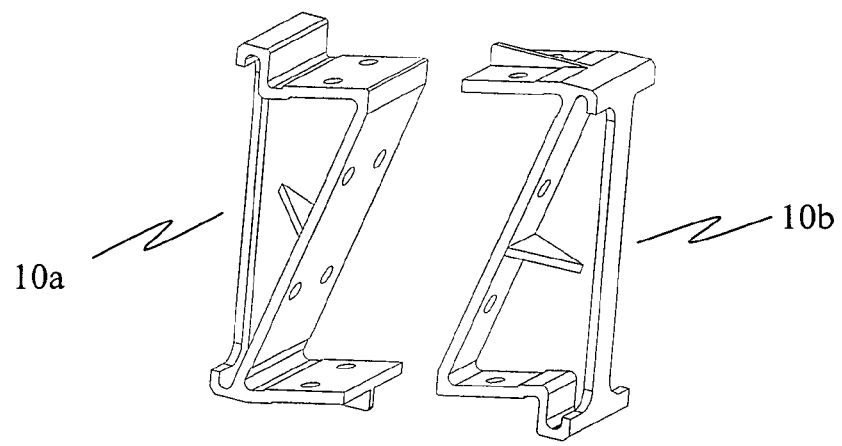
FIG. 6 is a three-dimensional drawing of a joint pair respectively with a positive arrangement and a reverse arrangement.
Figure 7:
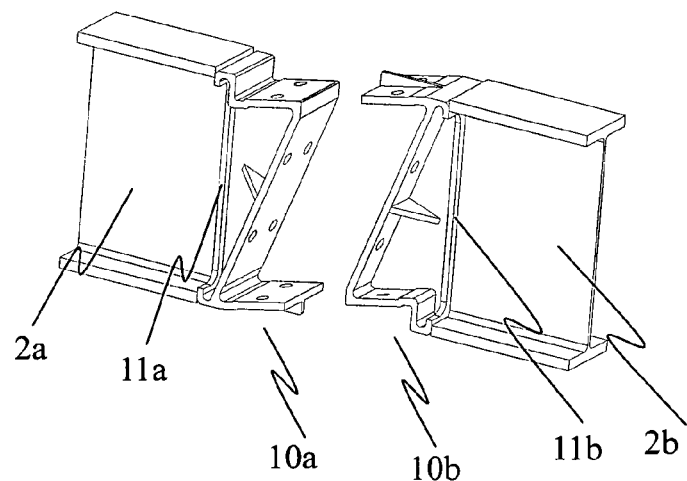
FIG. 7 is a three-dimensional drawing of the joint pair connected to the front beam and the rear beam respectively.
Figure 8:
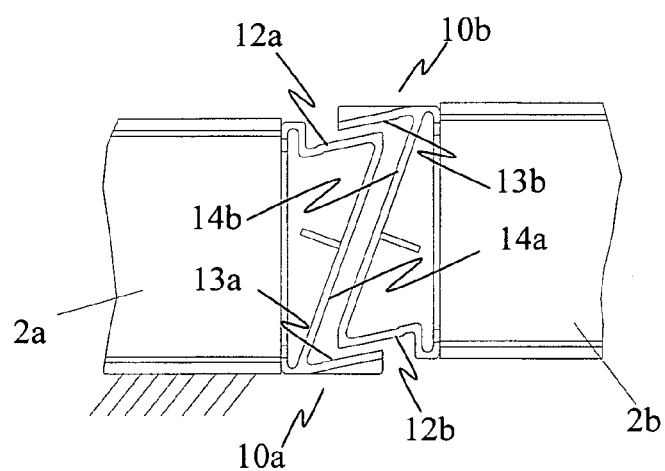
FIG. 8 illustrates the beam being assembled by using the joints.
Figure 9:
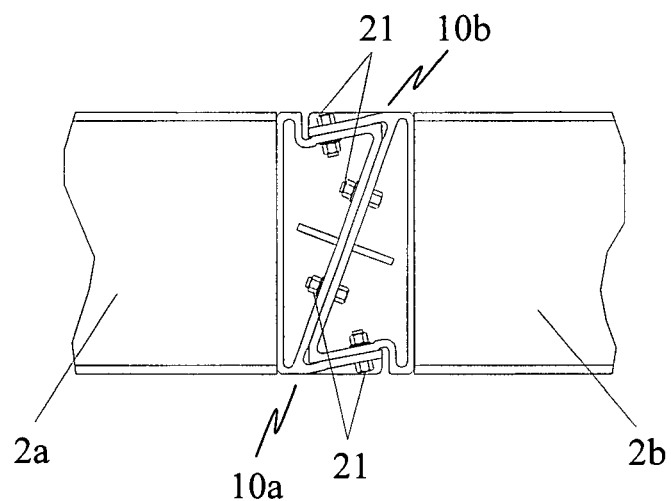
FIG. 9 illustrates the assembled beam with joints.

Now a method is illustrated of connecting the main beam using said joint. FIG. 6 shows two oppositely disposed joints 10a and 10b, wherein joints 10a and 10b have the same structure, just the directions are of 180° difference. The same slant angles of the second and the third connecting plate 12, 13 enable the joints 10a and 10b to engage with each other. When connecting the main beam, first two joints 10a and 10b are secured to a front beam 2a and a rear beam 2b of the main beam respectively, as shown in FIG. 7. Then, the secured joint pairs 10a, 10b are connected. As shown in FIG. 8, for example, first fix the end on which the joint 10a is secured, then the end on joint 10b is lifted a little and moved toward the joint 10a, and joint 10b is engaged into joint 10a so that the second, third and fourth connecting plate 12a, 13a, and 14a of joint 10a are in contact with the third, second and fourth connecting plate 13b, 12b, and 14b of joint 10b respectively. During the above-mentioned assembling, the second and the third connecting plates 12a and 13a of the fixed joint 10a provide a limit in the vertical direction, and the fourth connecting plate 14a of the fixed joint 10a provide a limit in the horizontal direction so that it is easy to achieve orientation when joint 10a and 10b are closed up. Afterwards, fasteners 21, for example bolts, are inserted into the holes 19 and screwed down to reliably connect the joints 10a and 10b, thus the front beam 2a and the rear beam 2b are connected. The connected beams are illustrated in FIG. 9.

When the vehicle is moving, forces caused by stretching, bending, twisting or shearing and the like are transferred to the joints through the main beam of container semi-trailer. In the present invention, the second and the third connecting plates are slantwise inwardly relative to the fourth connecting plate, and the second, third and fourth connecting plates 12, 13 and 14 of the joint pairs 10a and 10b are engaged with the respective ones. Therefore, the engaged second connecting plates and the third connecting plates bear a horizontal stretching force exerted on the joints. Similarly, the second connecting plates and third connecting plates bear a tension force caused by bending of the joint. The second, third and fourth joints bear the vertical shearing force on the joints. Similarly and obviously, the second, third and fourth joints bear a torque when the joint is twisted. Hence, the fasteners such as bolts are used to connect the joints without bearing external forces exerted on the joints. Because the pretightening force to connect the joints is relatively small and there is no alternate tightening and loosening, the bolts has an improved stress, and thus the service life and reliability of the connection are increased.

Figure 1:
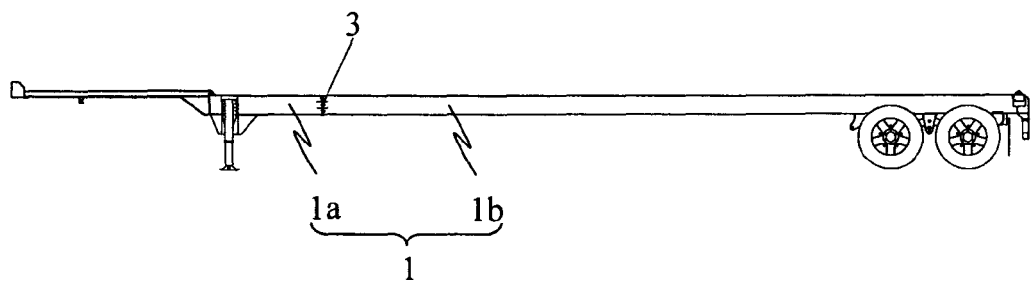
FIG. 1 illustrates the structure of a sectional container semi-trailer of 53 feet.
Figure 2:
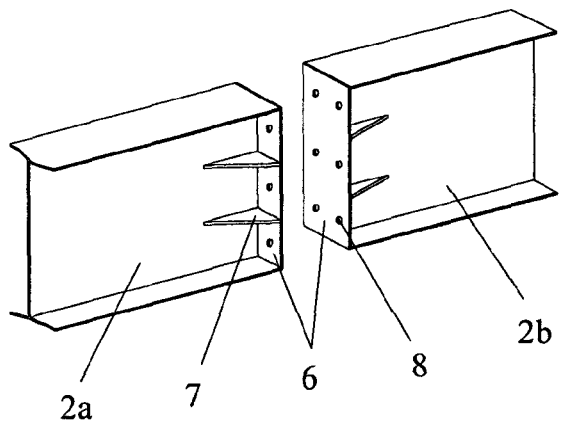
FIG. 2 illustrates the structure of a conventional joint.
Figure 3:
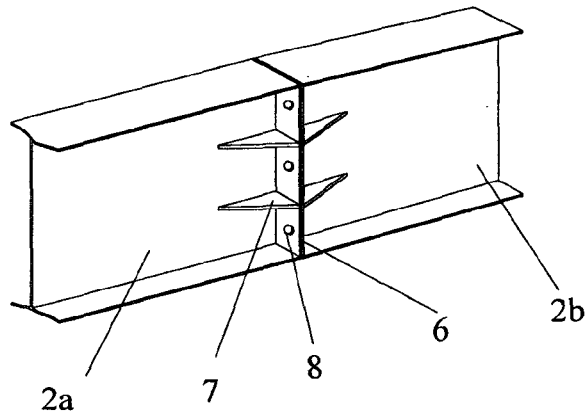
FIG. 3 illustrates the a main beam of container semi-trailer with the conventional joint.

Furthermore, the stress distributions of the joints of the present invention and the conventional joints (as shown in FIG. 3) are of great difference. In the present invention, the external force mainly acts upon the second, third and/or fourth connecting plates, wherein the area of the load bearing cross section is much greater than that of the prior art. Therefore, the stress condition on the joints of the present invention is much better than that of the joints in the prior art. Additionally, when the external force which causes the deformation acts upon the joints of the present invention, the second and the third connecting plates are far away from a neutral layer of deformation of the joints so that the practical stress distributions of said second and third connecting plates are also improved. Hence, the joints having such a design have a longer service life.

Figure 10:
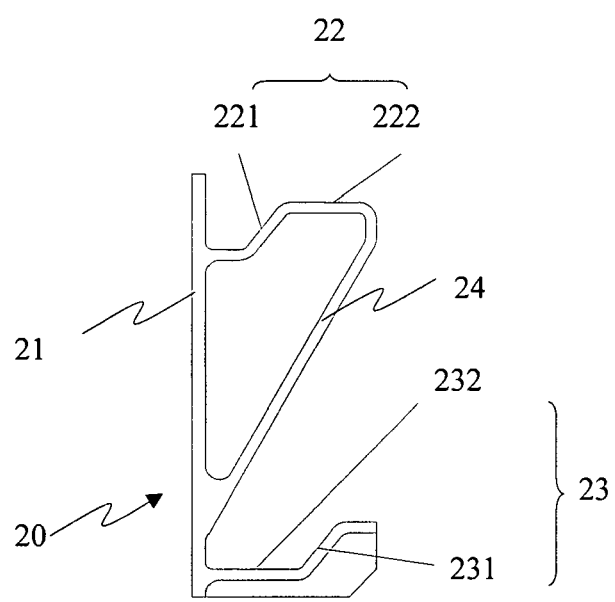
FIG. 10 illustrates another joint according to another preferred embodiment of the present invention.

FIG. 10 illustrates a joint 20 of another preferred embodiment according to the present invention. Said joint 20 comprises: a first connecting plate 21 connected to the main beam; a second connecting plate 22 and a third connecting plate 23, both of which are connected to the same side of the first connecting plate 21; and, a fourth connecting plate 24 slantingly connected between said second connecting plate 22 and said third connecting plate 23. Specially, the second connecting plate 22 comprises a bent portion 221 secured to the first connecting plate 21 and a base 222, wherein the bent portion 221 is sunk from the surface of the base 22. Also, the third connecting plate 23 comprises a bent portion 231 and a base 232, wherein said third connecting plate 23 is connected to the first connecting plate 21 through said base 232, and the second bent portion 231 is protruded from the surface of said base 232. The two opposite ends of the fourth connecting plate 24 are secured to the base 222 and the bent portion 231 respectively.

Figure 11:
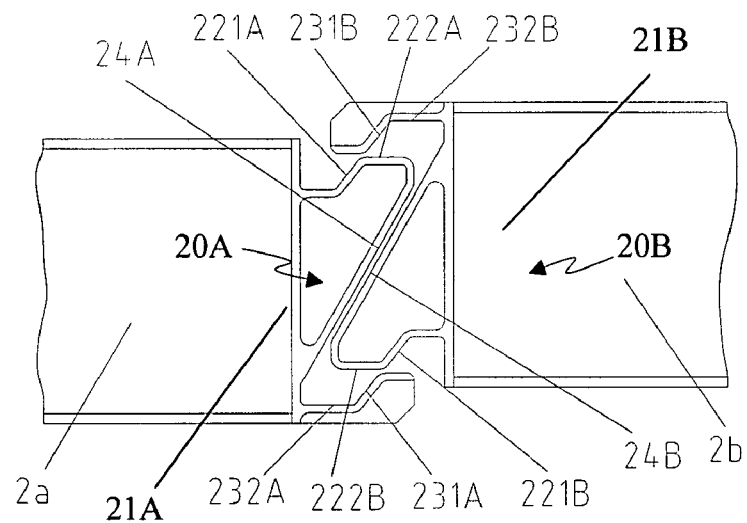
FIG. 11 illustrates the beam being assembled by using the joints illustrated in FIG. 10.
Figure 12:
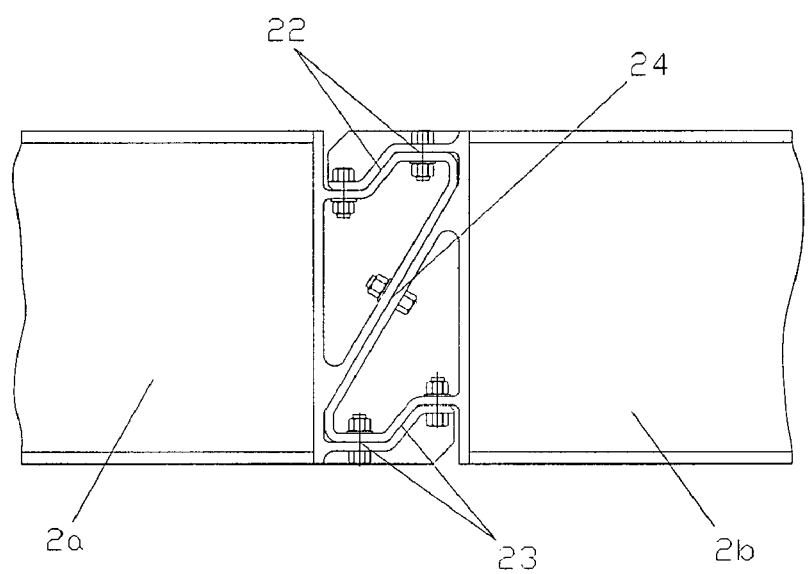
FIG. 12 illustrates the assembled beam with the joints in FIG. 11.

Similarly, when connecting the beam, the joint pairs 20a and 20b are first secured to a front beam and a rear beam of the main beam respectively. For example, as shown in FIG. 11, the first joint 20a is welded to the front beam 2a through the first connecting plate 21a while the second joint 20b is welded to the rear beam 2b through the second connecting plate 21b, Then, the two joints 20a and 20b are closed up to each other. The bent portion 221a and the base 222a of the second connecting plate 22a of the joint 20a and the bent portion 231a and the base 232a of the third connecting plate 23a of the joint 20b, the fourth connecting plate 24a and the 24b, the bent portion 231b and the base 232b of the third connecting plate 23b and the bent portion 221b and the base 222b of the second connecting plate 22, are closed up to each other respectively. Finally, the joints 20a and 20b are connected by fasteners to achieve the connection of the front beam 2a and the rear beam 2b. The assembly is illustrated in FIG. 11, and the connected beams are illustrated in FIG. 12.

The other structure of the joint 20 and the principle of improving the stress distribution of the connection by the joints 20 are similar to the aforementioned embodiment and will not be described again in detail here.

It should be understood that although an object of the present invention is to solve the problem of transporting the extremely long semi-trailer using containers, the joint can also meet the requirement of connecting other similar structure.

While the invention has been described with reference to the specific embodiments described above, it is evident that many alternatives, modifications and variations are apparent to those skilled in the art. Accordingly, the preferred embodiments of the invention as set forth above are intended to be illustrative and not limiting. Various changes can be made without departing from the spirit and scope of the invention.

What is claimed is:

1. A main beam of a container semi-trailer comprising at least a front beam and a rear beam, wherein the front beam and rear beam are connected by two joints, each said joint connected to a respective one of said front beam and said rear beam and comprising:

a first connecting plate connected to the said respective front beam or said rear beam;

a second connecting plate extending transversely from said first connecting plate, said second connecting plate having a proximal end connected to said first connecting plate and an opposing distal end;

a third connecting plate spaced from said second connecting plate, said third connecting plate extending transversely from said first connecting plate, said third connecting plate having a proximal end connected to said first connecting plate and an opposing distal end; and a fourth connecting plate slantingly connected between said distal end of said second connecting plate and said proximal end of said third connecting plate; and a web plate having edges defining a perimeter and being connected to said first, second and fourth connecting plates, said first, second and fourth connecting plates each having lateral edges defining a width and configured to form a closed chamber that encloses said perimeter of said web plate, wherein said second and third connecting plates of each joint are configured that when two of said joints are engaged with each other, said second and said third connecting plates of a first of said two engaged joints are respectively matingly engaged with and connected to said third and said second connecting plates of the other of said two engaged joints, and said fourth connecting plates of said two engaged joints are matingly engaged with and connected to one another to bear a horizontal stretching force exerted on the engaged joints.

2. The main beam of a container semi-trailer according to claim 1, wherein the joint on the front beam is in an arrangement of rotation of 180° about the joint on the rear beam.

3. The main beam of claim 1, wherein said third connecting plate has a connecting surface, directed toward said second connecting plate, and a rear surface facing away from said second connecting plate and having a reinforcing rib disposed thereon to reinforce said third connecting plate.

4. The main beam of claim 1, further comprising two reinforcing ribs connected to said fourth connecting plate of each said joint, said reinforcing ribs being disposed on opposing sides of the web plate respectively to reinforce said fourth connecting plate.

5. The main beam of claim 1, wherein said second connecting plate and said third connecting plate of each said joint are parallel.

6. The main beam of claim 1, further comprising holes for fasteners disposed on the second, third and fourth connecting plates respectively, such that fasteners inserted in said holes to connect said joined second and third plates are oriented generally transverse to the horizontal stretching force.

7. The main beam of claim 1, wherein said web plate is centered between said lateral edges of said first, second and fourth connecting plates.

8. The main beam of claim 1, wherein said fourth connecting plate of each said joint comprises at least two through holes located on opposing sides of said web plate for receiving fasteners.

9. A method of connecting a main beam of a container semi-trailer, the main beam of the container semi-trailer comprising at least a front beam and a rear beam, wherein the method comprises steps of:

providing a first joint connected to the front beam and a second joint connected to the rear beam, wherein each joint has:

a first connecting plate connected to a respective one of the front beam and the rear beam of the container semi-trailer;

a second and a third connecting plate each secured to and extending transversely from the same side of the first connecting plate and spaced apart from each other, the second and third connecting plates each having a proximal end connected to said first connecting plate and an opposing distal end; and a fourth connecting plate slantingly connected between the distal end of the second connecting plate and the proximal end of the third connecting plate; and a web plate having edges defining a perimeter and being connected to the first, second and fourth connecting plates, the first, second and fourth connecting plates each having lateral edges defining a width and configured to form a closed chamber that encloses said perimeter of said web plate; and connecting the first joint with the second joint so that the second and the third connecting plates of the first joint are respectively matingly engaged with and connected to the third and the second connecting plates of the second joint, and the fourth connecting plates of the first and second joints are matingly engaged with and connected to one another to bear a horizontal stretching force exerted on the joints.

10. The method according to claim 9, wherein the method further comprises steps of turning the second joint upside down and then securing the second joint to the rear beam.

* * * * *